US005845677A

United States Patent [19]

Kim

[11] Patent Number: 5,845,677

[45] Date of Patent: Dec. 8, 1998

[54] DUAL THROTTLE VALVE

[75] Inventor: Yong-Woo Kim, Seoul, Rep. of Korea

[73] Assignee: Kia Motors Corporation, Seoul, Rep. of Korea

[21] Appl. No.: 725,114

[22] Filed: Oct. 2, 1996

[30] Foreign Application Priority Data

Sep. 3, 1996 [KR] Rep. of Korea ...................... 96-38065

[51] Int. Cl.[6] ...................................................... F16K 11/18

[52] U.S. Cl. .......................... 137/595; 123/336; 123/584; 137/601; 137/865

[58] Field of Search .................................... 137/595, 865, 137/601; 123/336, 584

[56] References Cited

U.S. PATENT DOCUMENTS

| | | | |
|---|---|---|---|
| 1,600,008 | 9/1926 | Mock | 137/595 |
| 2,547,902 | 4/1951 | Burton | 137/865 X |
| 2,722,207 | 11/1955 | Sarto | 123/584 |
| 3,572,656 | 3/1971 | Oshima | 137/601 X |
| 3,938,430 | 2/1976 | Koppang | 137/601 X |
| 4,037,571 | 7/1977 | Ishida | 123/584 X |
| 5,036,816 | 8/1991 | Mann | 123/336 X |

*Primary Examiner*—Stepen M. Hepperle
*Attorney, Agent, or Firm*—Jaiwook Lee; Mark G. Sandbaken

[57] ABSTRACT

The present invention relates to a dual throttle valve of a car which includes an intake pipe divided into a primary intake path for low speed and a secondary intake path for middle or high speed, a primary throttle valve, a secondary throttle valve, a pinion, a fan-shaped gear, and a semi-circular member, wherein at a low speed, only the primary throttle valve rotates to open the primary intake path having a smaller diameter than the secondary intake path and at a middle or high speed, the primary and secondary throttle valves rotate sequentially to open the primary and secondary intake paths gradually even when the sudden accelerating for starting or outrunning occurs, so that waste of fuel at a low speed due to the sudden oversupply of gas and the occurrence of harmful exhaust gas due to the incomplete combustion at a middle or high speed can be prevented by controlling the amount of the intake gas.

3 Claims, 2 Drawing Sheets

DUAL THROTTLE VALVE

BACKGROUND OF THE INVENTION

A. Field of the Invention

The present invention relates to a dual throttle valve of a car, in which a primary throttle valve for low speed and a secondary throttle valve for middle or high speed are provided and are opened to control amount of intake gas according to varying speed, so that accelerating for starting and outrunning is achieved smoothly and the engine performance is greatly improved.

B. Description of Related Art

Conventionally, a car has a throttle valve rotating in response to the operation of a throttle lever to control the amount of intake air and mixture gas of the engine.

FIG. 1 and FIG. 2 show such a conventional throttle valve. The throttle valve comprises an opening/shutting disc 1 and a shaft 2 on which the disc 1 rotates, and is located in an intake valve 10. An intake path is formed in the intake valve 10 by one directional rotation of the opening/shutting disc 1 of the throttle valve when an accelerating cable 3 is pulled in response to the pushing of the accelerating pedal. Then, gas is supplied through the intake path to combustion chambers of cylinders and power is obtained by fuel combustion. In this case, power output of an engine depends upon the opening degree of the throttle valve and speed of a car is controlled by the power output of the engine.

However, the above conventional throttle valve has disadvantages that since the opening angle of the disc 1 of the throttle valve is constant when the pulling force of the accelerating cable is constant, the power output of the engine suddenly increases when an instantaneous overload is imposed at the time of quick starting or outrunning. In this case, harmful exhaust gas increases due to the incomplete combustion of the intake gas, and fuel consumption increases. Also, riding in that condition feels uncomfortable.

SUMMARY OF THE INVENTION

The object of the present invention is, therefore, to provide a dual throttle valve to control the amount of the intake gas by two steps according to varying speed and to decrease the fuel consumption by preventing oversupply of gas.

Another object of the present invention is to provide a dual throttle valve which improves the riding feeling and reduces the amount of the harmful exhaust gas with an excellent engine performance.

According to the present invention, the above object can be achieved by a dual throttle valve of a car which comprises an intake pipe divided into a primary intake path for low speed and a secondary intake path for middle or high speed, the secondary intake path having a larger diameter than the primary intake path, a primary throttle valve having a first opening disc and a primary shaft on which the first opening disc rotates in the primary intake path, a secondary throttle valve having a second opening disc which is larger than the first opening disc in diameter and a secondary shaft on which the second opening disc rotates in the secondary intake path, a pinion coupled with one end part of the primary shaft on the external surface of the primary intake path and rotating together with the primary shaft, a fan-shaped gear coupled with one end part of the secondary shaft on an upper part of the external surface of the secondary intake path and engaged with the pinion to pivot on the secondary shaft in a predetermined range of angle, and a semi-circular member coupled with the one end part of the secondary shaft on a lower part of the external surface of the secondary intake path and facing the fan-shaped gear, wherein at a low speed, only the primary throttle valve rotates to open the primary intake path having smaller diameter than the secondary intake path and at a middle or high speed, the primary and secondary throttle valves rotate sequentially to open the primary and secondary intake paths gradually in spite of quick accelerating.

Therefore, waste of fuel at a low speed due to the sudden oversupply of gas and the occurrence of harmful exhaust gas due to the incomplete combustion of fuel at a middle or high speed can be prevented by controlling the amount of intake gas by means of the dual throttle valve.

BRIEF DESCRIPTION OF THE DRAWINGS

The invention will now be described by way of example with reference to the accompanying drawings, in which.

DETAILED DESCRIPTION OF A PREFERRED EMBODIMENT

Figure 1:
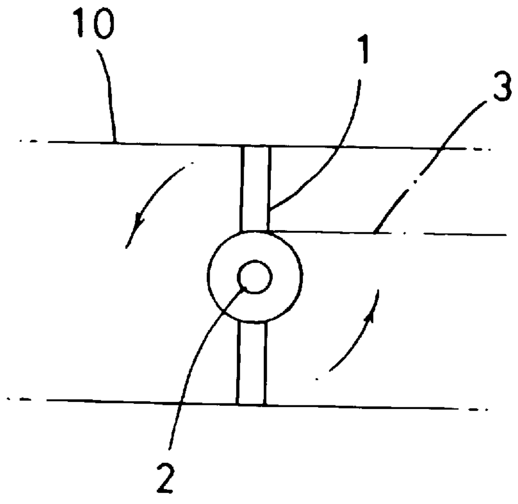
FIG. 1 (PRIOR ART)
FIG. 1 is a schematic side view showing a conventional throttle valve.
Figure 2:
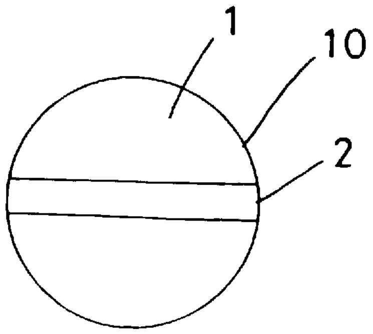
FIG. 2 (PRIOR ART)
FIG. 2 is a schematic front view showing a principal part of the conventional throttle valve of FIG. 1.
Figure 3:
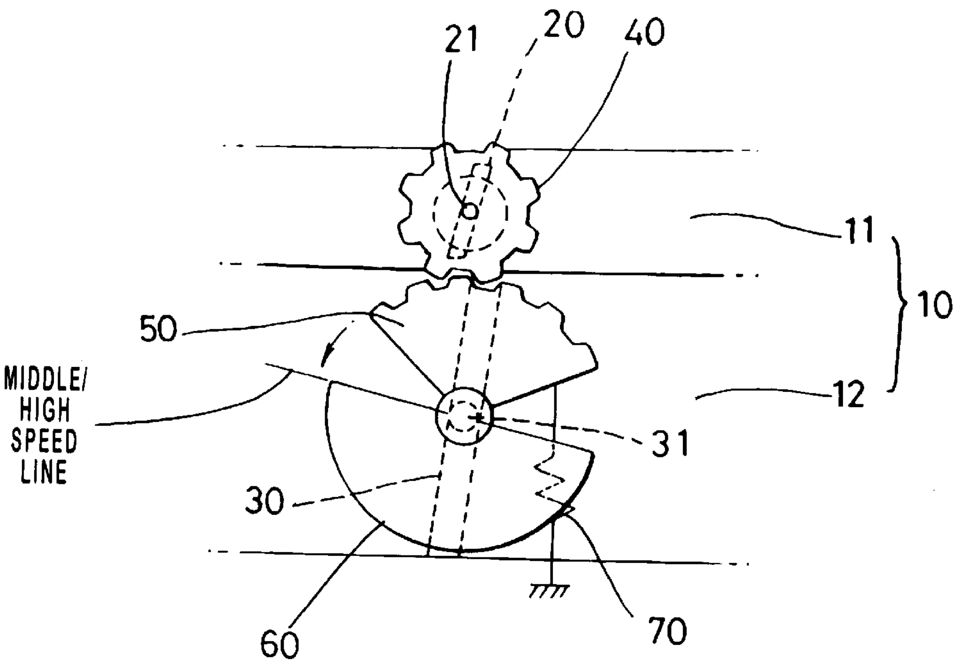
FIG. 3 is a schematic side view showing a dual throttle valve according to the present invention.
Figure 4:
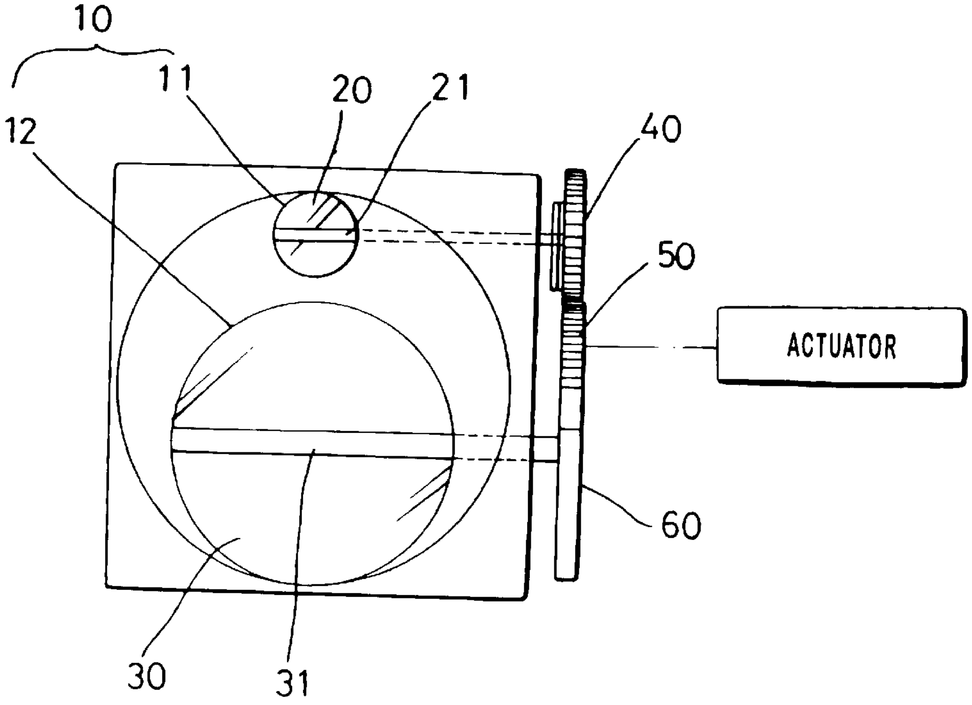
FIG. 4 is a schematic front view showing principal parts of the dual throttle valve of FIG. 3.

FIG. 3 shows a schematic side view of a dual throttle valve according to an embodiment of the present invention. In FIG. 3, an intake pipe 10 connected to a combustion chamber is divided into a primary intake path 11 for low speed and a secondary intake path 12 for middle or high speed. A primary throttle valve for low speed is located in the primary intake path 11 and a secondary throttle valve for middle or high speed is located in the secondary intake path 12 respectively.

The primary throttle valve has a first opening disc 20 and a primary shaft 21 on which the first opening disc 20 rotates to open and shut the primary intake path 11 at a low speed. A pinion 40 is coupled with one end part of the primary shaft 21 at the external surface of the primary intake path 11 so that the pinion 40 rotates together with the primary throttle valve. The pinion 40 is engaged with a fan-shaped gear 50.

The secondary throttle valve has a second opening disc having a larger diameter than the first opening disc and a secondary shaft on which the second opening disc rotates to open and shut the secondary intake path 12 at a middle or high speed. The fan-shaped gear 50 is connected with one end part of the secondary shaft 31 by means of a hinge on an upper part of the external surface of the secondary intake path 12. The fan-shaped gear 50 pivots on the secondary shaft 31 by a rotary power transmitted from the external through an unshown throttle lever or an actuator by pushing an accelerating pedal.

Further, a semi-circular member 60 is coupled with the one end part of the secondary shaft 31 at a lower part of the external surface of the secondary intake path 12, facing the fan-shaped gear 50. The semi-circular member 60 pivots on the secondary shaft 31 by contacting with one side of the fan-shaped gear 50 as the secondary shaft 31 of the secondary throttle valve rotates to open and shut the secondary intake path 12 at a middle or high speed.

The fan-shaped gear 50 connected with the throttle lever or the actuator (not shown) receives rotary power from the outside and drives the pinion 40 to rotate on the primary shaft 21 when starting or low speed driving. Therefore, the first opening disc 20 of the primary throttle valve rotates in response to the rotation of the pinion 40 to open the primary intake path 11, so that the gas is supplied to the combustion chamber through the primary intake path 11 having a relatively smaller diameter than the secondary intake path 12.

Referring to FIG. 3, low speed driving is performed within the range of rotation of the fan-shaped gear 50, that is, within a semi-circular region above the semi-circular member 60.

In case of middle or high speed driving, the fan-shaped gear 50 receives larger rotary power from the outside and pivots beyond the semi-circular region, thereby coming into contact with one side of the semi-circular member 60. Then, the semi-circular member 60 begins to pivot on the secondary shaft 31 and the secondary opening disc 30 of the secondary throttle valve, which is connected with the semi-circular member 60 via the secondary shaft 31, begins to rotate in response to the pivoting of the semi-circular member 60, thereby opening the secondary intake path 12.

If the second opening disc 30 of the secondary throttle valve begins to rotate by the pivoting of the semi-circular member 60, the fan-shaped gear 50 is released from the engagement with the pinion 40 and the first intake path remains opened without pivoting of the fan-shaped gear 50.

Preferably, a return spring 70 is mounted at the fan-shaped gear 50 and/or the semi-circular member 60 from the outside of the intake pipe 10 to facilitate returning of the fan-shaped gear 50 and/or the semi-circular member 60 from middle or high speed positions to low speed position more precisely and quickly.

According to the dual throttle valve as described above, the amount of the intake gas supplied to the combustion chamber increases gradually by sequentially opening the primary intake path for low speed and the secondary intake path for middle or high speed, even when a sudden accelerating for starting or outrunning occurs. Accordingly, a car can start and outrun smoothly and the engine performance is greatly improved. The car with the dual throttle valve of the present invention can provide comfortable riding and decrease the harmful exhaust gas by preventing the instantaneous overload, thereby reducing the fuel consumption.

Further, the amount of the intake gas can be reduced by opening only the primary intake path having a smaller diameter than the secondary intake path at a low speed, so that oversupply of gas at a low speed can be prevented.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A dual throttle valve of a car comprising:

an intake pipe member divided into a primary intake path for low speed and a secondary intake path for middle or high speed, the secondary intake path having a larger diameter than the primary intake path, a primary throttle valve having a first opening disc and a primary shaft on which the opening disc rotates in the primary intake path, a secondary throttle valve having a second opening disc which is larger than the first opening disc in diameter and a secondary shaft on which the second opening disc rotates in the secondary intake path, a pinion coupled with one end part of the primary shaft on the external surface of the primary intake path and rotating together with the primary shaft, a fan-shaped gear coupled with one end part of the secondary shaft on an upper part of the external surface of the secondary intake path and engaged with the pinion to pivot on the secondary shaft in a predetermined range of angle, and a semi-circular member coupled with the one end part of the secondary shaft on a lower part of the external surface of the secondary intake path and facing the fan-shaped gear.

2. A dual throttle valve as claimed in claim 1, wherein a return spring is mounted at the fan-shaped gear from the outside of the intake pipe.

3. A dual throttle valve as claimed in claim 1, wherein a return spring is mounted at the semi-circular member from the outside of the intake pipe.

* * * * *